(No Model.) 7 Sheets—Sheet 1.
C. H. COOLEY & F. H. RICHARDS.
GRAIN WEIGHER.
No. 442,724. Patented Dec. 16, 1890.
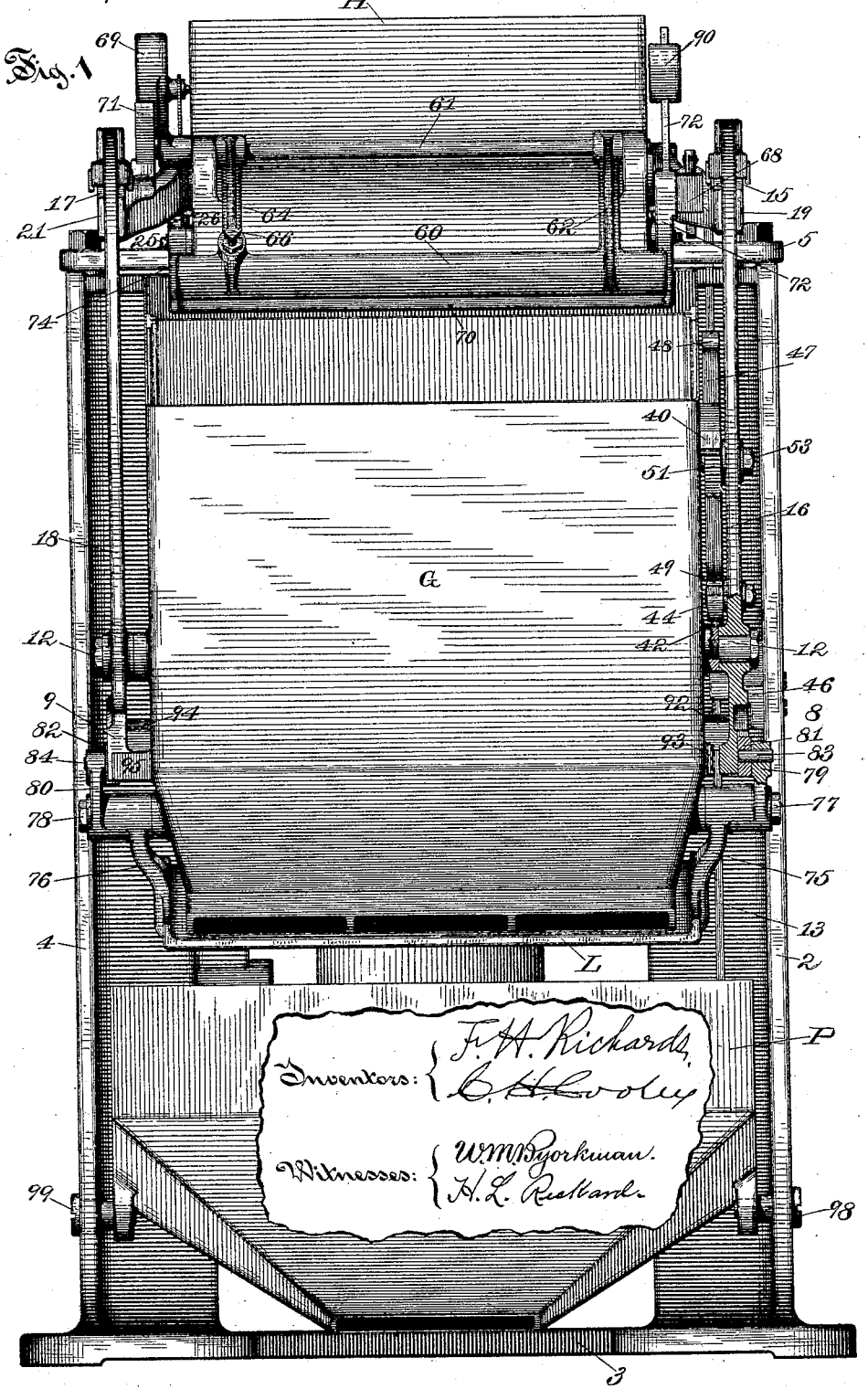

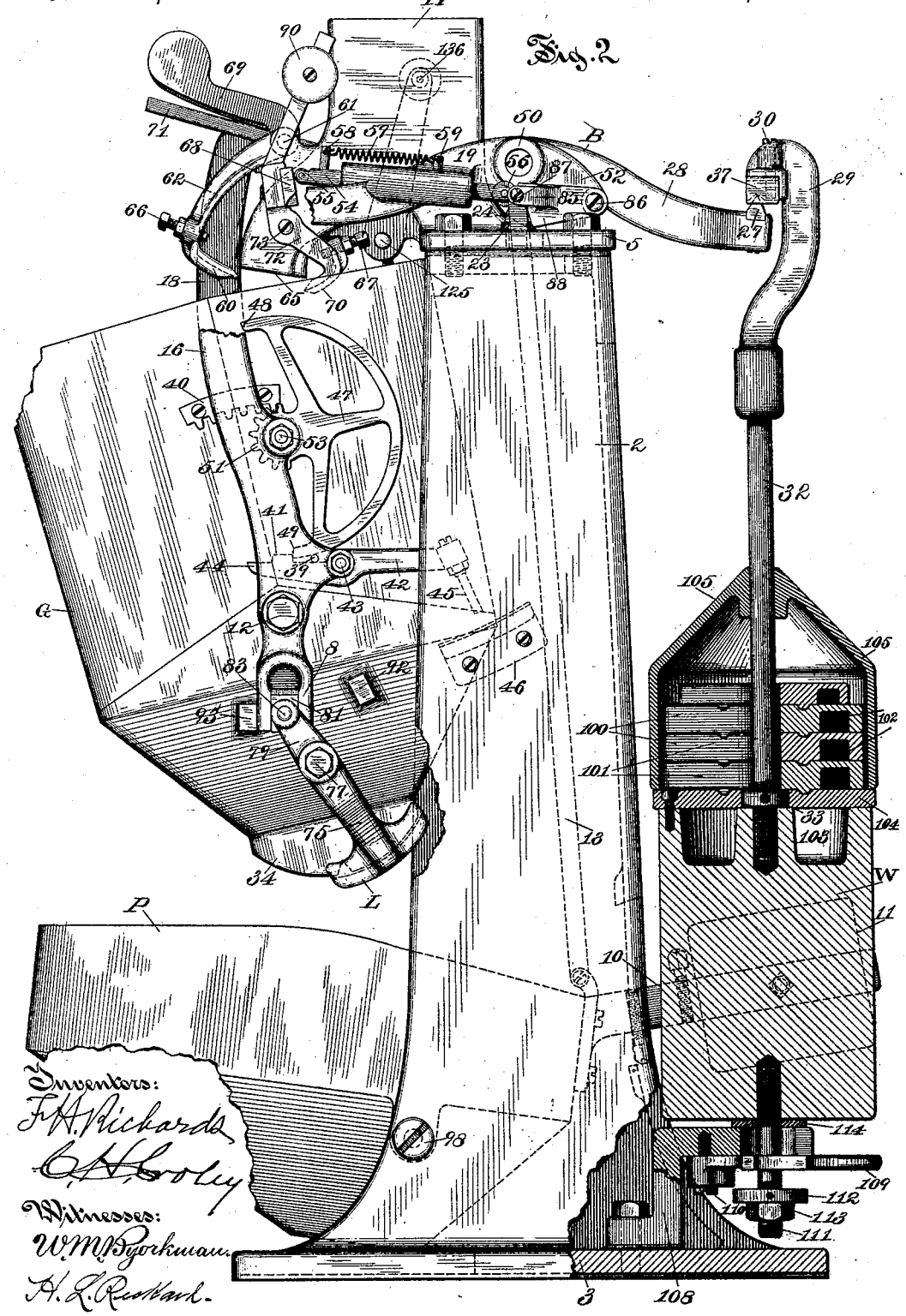

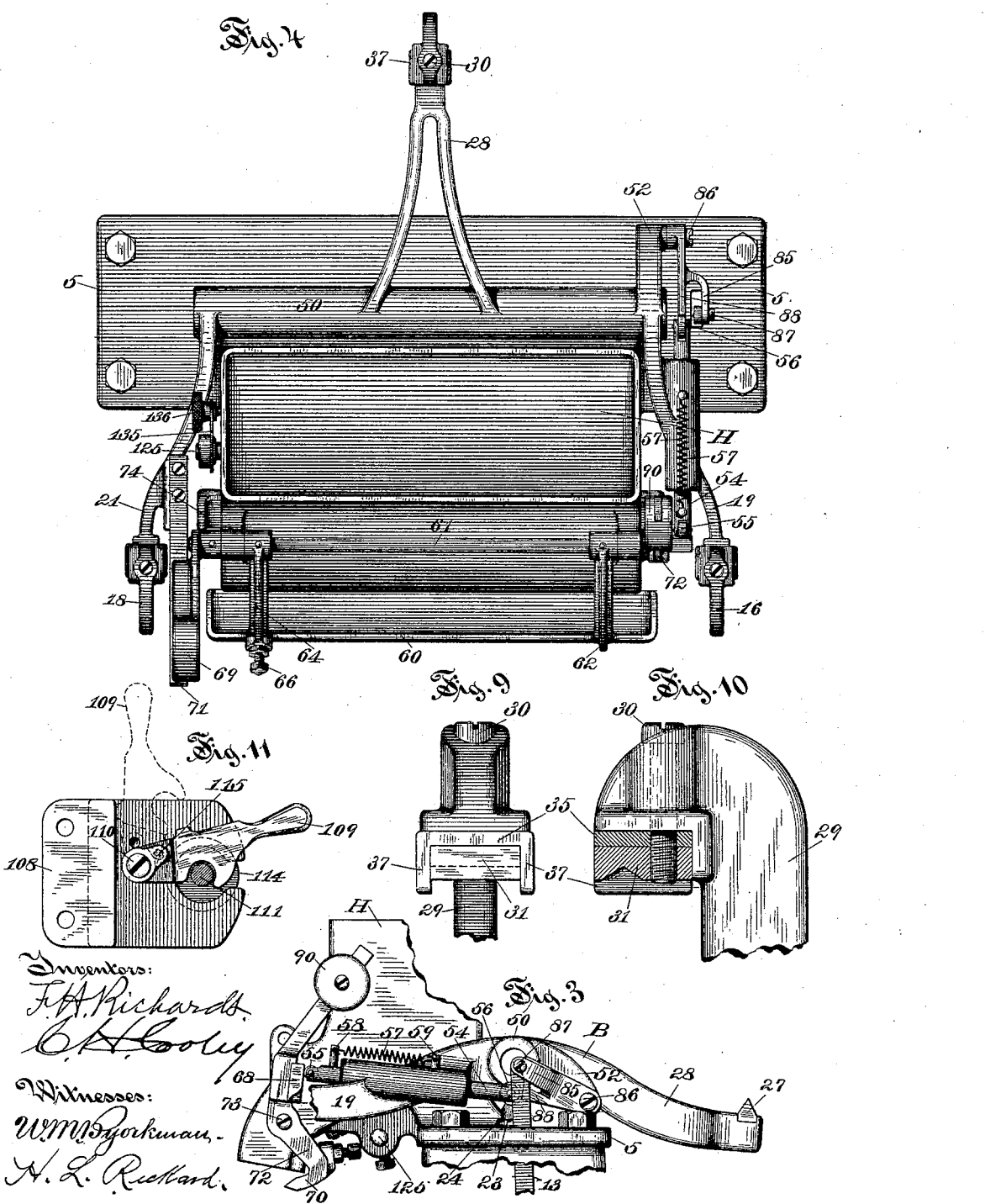

(No Model.) 7 Sheets—Sheet 4.
C. H. COOLEY & F. H. RICHARDS.
GRAIN WEIGHER.
No. 442,724. Patented Dec. 16, 1890.
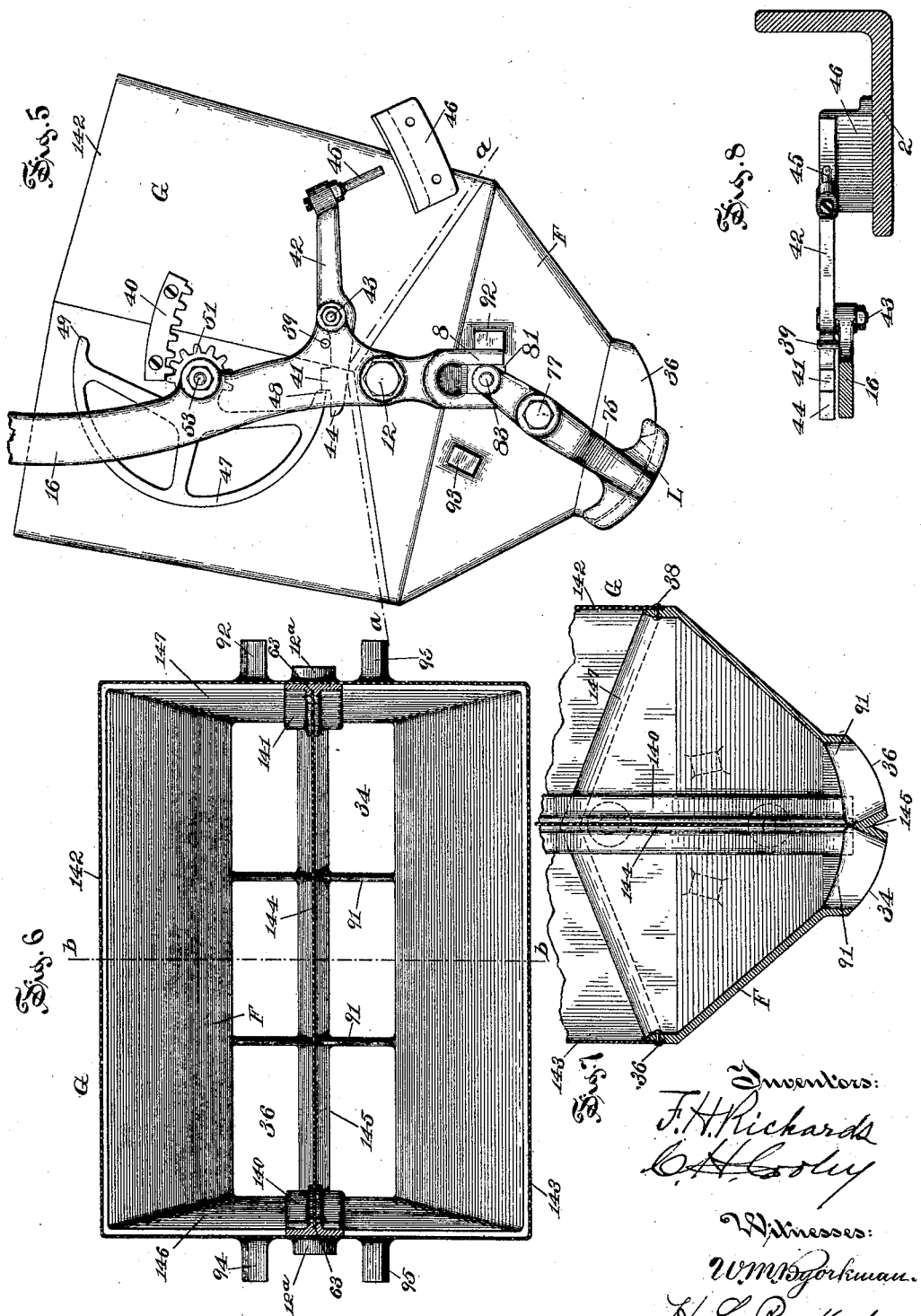

(No Model.) 7 Sheets—Sheet 5.
C. H. COOLEY & F. H. RICHARDS.
GRAIN WEIGHER.
No. 442,724. Patented Dec. 16, 1890.
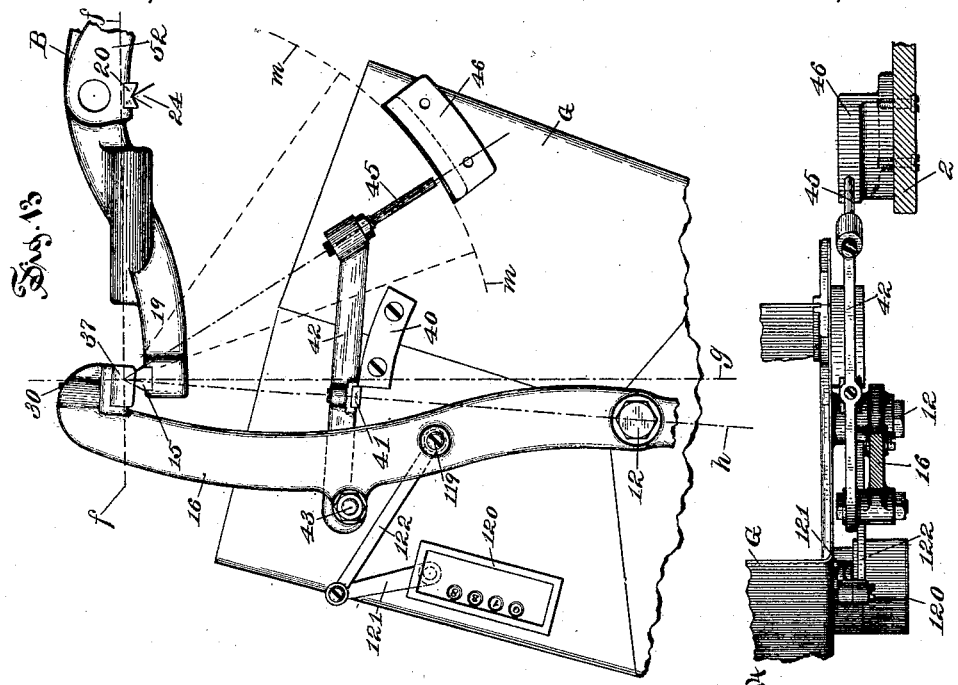
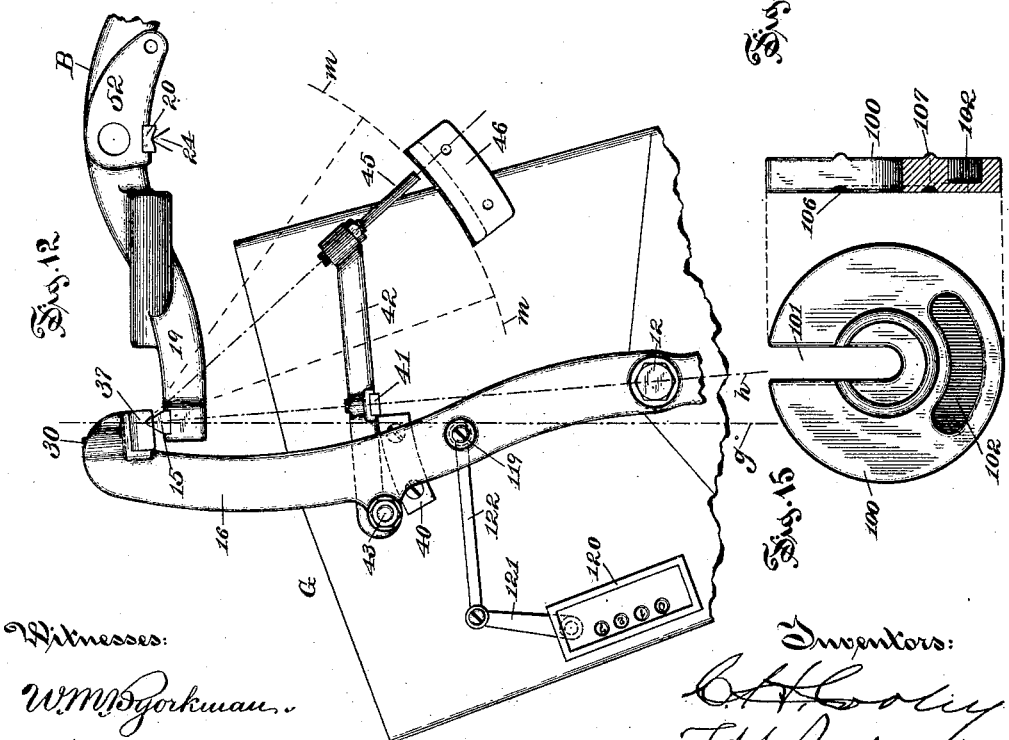
Witnesses:
W. M. Bjorkman.
H. L. Reckard.
Inventors:
C. H. Cooley
F. H. Richards

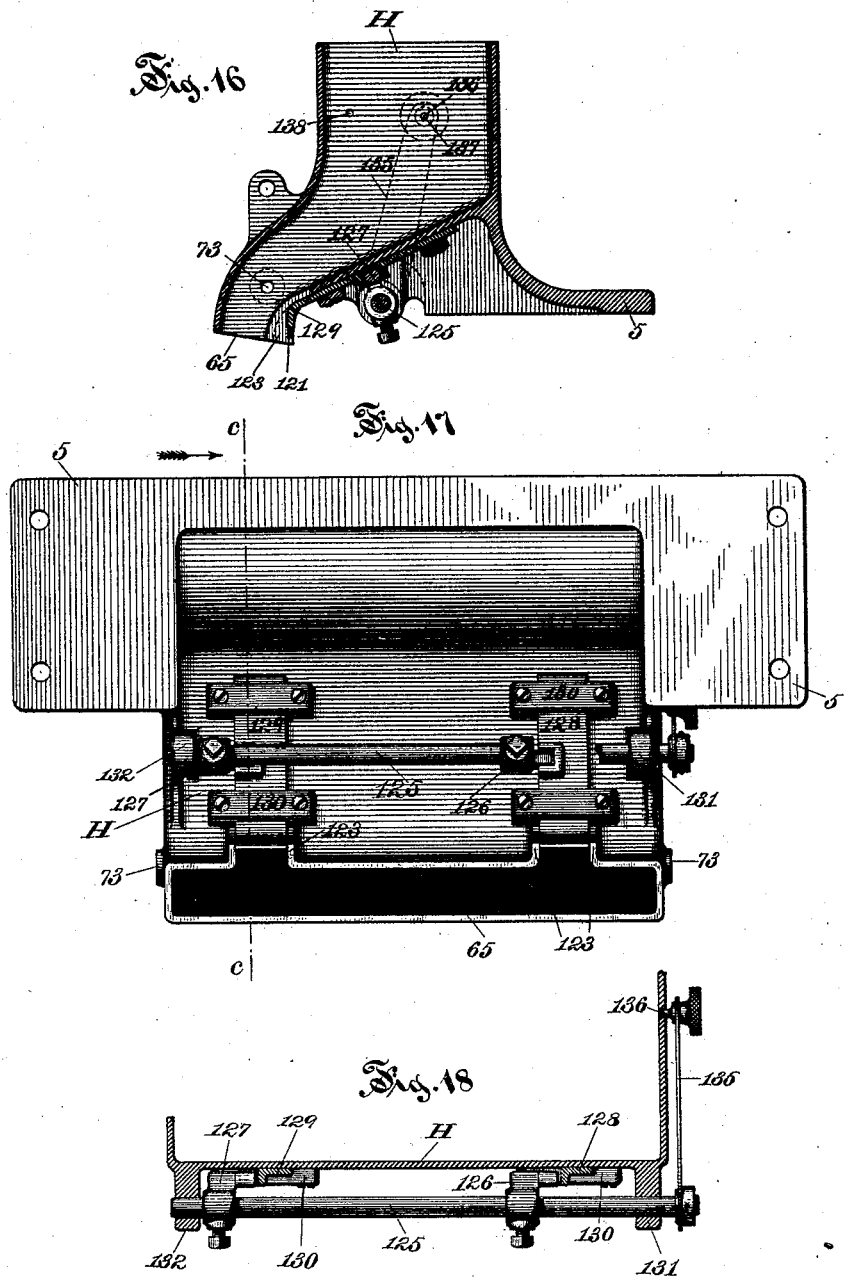

(No Model.) 7 Sheets—Sheet 7.
C. H. COOLEY & F. H. RICHARDS.
GRAIN WEIGHER.
No. 442,724. Patented Dec. 16, 1890.
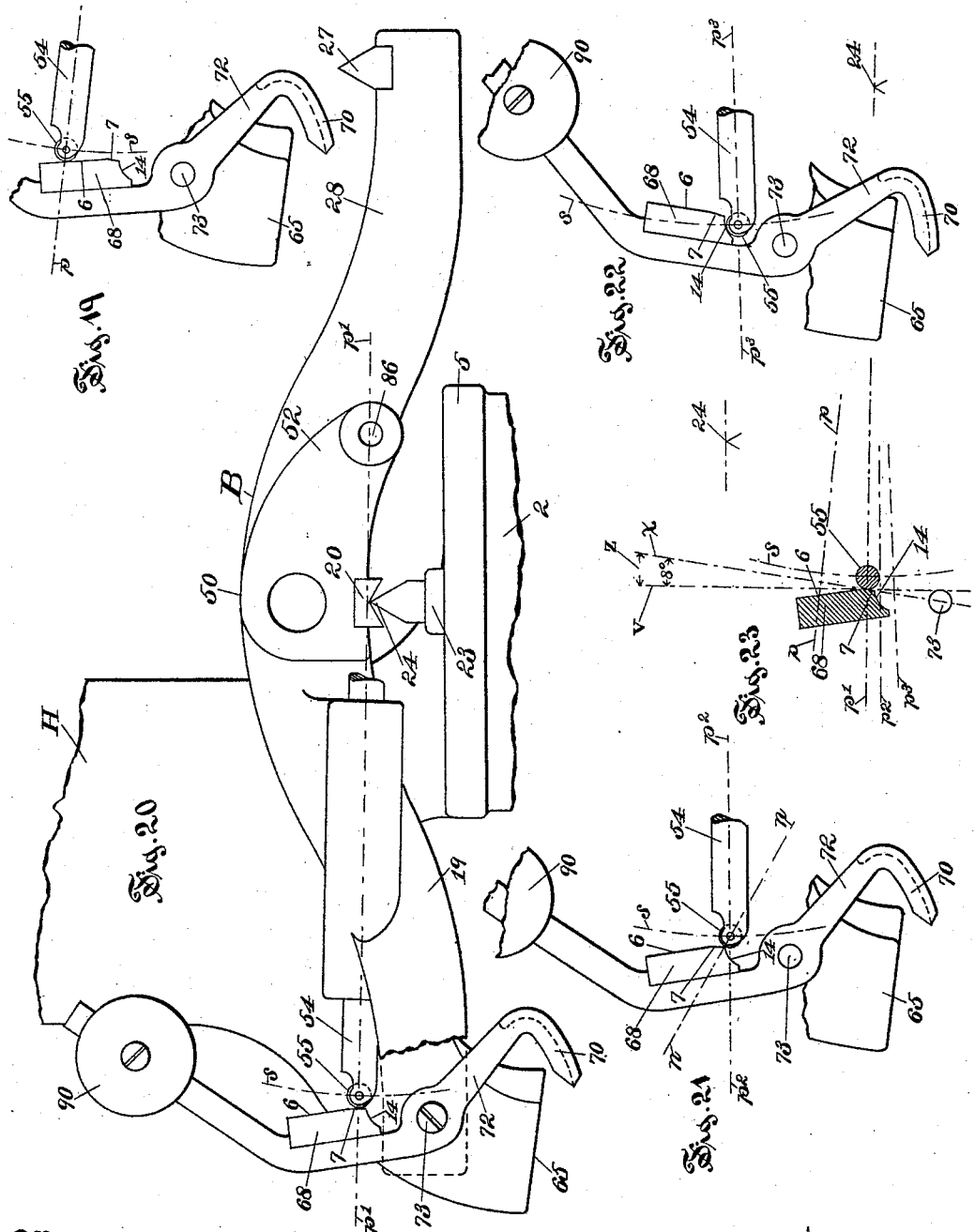
Witnesses:
W. M. Bjorkman.
Henry L. Reckard.
Inventors:
F. H. Richards.
Charles H. Cooley

UNITED STATES PATENT OFFICE.

CHARLES H. COOLEY AND FRANCIS H. RICHARDS, OF HARTFORD, CONNECTICUT, ASSIGNORS TO THE PRATT & WHITNEY COMPANY, OF SAME PLACE.

GRAIN-WEIGHER.

SPECIFICATION forming part of Letters Patent No. 442,724, dated December 16, 1890.

Application filed February 11, 1890. Serial No. 339,967. (No model.)

*To all whom it may concern:*

Be it known that we, CHARLES H. COOLEY and FRANCIS H. RICHARDS, citizens of the United States, residing at Hartford, in the county of Hartford and State of Connecticut, have invented certain new and useful Improvements in Grain-Weighers, of which the following is a specification.

This invention relates to automatic grain-weighers operated by the power or weight of the grain being weighed.

Our invention has for its object the improvement of the machine to render the same more accurate and effective, and more reliable when operated continuously for considerable periods of time under the relatively adverse conditions of ordinary commercial work.

In the drawings accompanying and forming a part of this specification, Figure 1 is a front elevation of an automatic grain-weigher embodying our present improvements. Fig. 2 is a side elevation of the machine, some details being broken away and some others being shown in section. Fig. 3 is a side elevation similar to the upper part of Fig. 2, but showing some of the parts in a different position. Fig. 4 is a plan view of the parts shown in Fig. 3, together with some other details. Fig. 5 is a side elevation of the bucket mechanism. Fig. 6 is a horizontal section of the bucket in line $a\ a$, Fig. 5. Fig. 7 is a vertical section of that portion of the bucket shown in Fig. 6, the view being taken in the line $b\ b$. Fig. 8 is a plan view of some of the parts shown in Fig. 5 and including a section of one side 2 of the frame-work. Figs. 9 and 10 are enlarged rear and side elevations, respectively, of the upper end of the weight-supporting hook, showing the combination therewith of the V-shaped bearing, the side stops, and retaining-screw. Fig. 11 is a plan view of the under side of the device for temporarily locking the machine to prevent the automatic or accidental discharge of the load of grain in the bucket. Figs. 12 and 13 are side views of portions of the bucket mechanism and accessory devices, including the registering apparatus, together with diagrams illustrating certain peculiar features of the construction and operation of the machine. Fig. 14 is a plan view of some of the devices shown in Figs. 12 and 13. Fig. 15 shows in two views one of the load-weights. Fig. 16 is a vertical section of the supply-chute, the view being taken in the line $c\ c$ of Fig. 17, looking in the direction of the arrow. Fig. 17 is a plan view of the under side of the supply-chute, (which, as here shown, is formed integral with the top plate 5, that forms a part of the frame-work of the machine,) and showing the drip-regulator. Fig. 18 is a longitudinal sectional view through the floor of the supply-chute and the drip-regulating slides. Figs. 19, 20, 21, 22, and 23 are enlarged diagrammatic views illustrating certain features of the construction and operation of the machine, and especially of the valve mechanism.

Similar characters designate like parts in all the figures.

The frame-work for carrying the operative parts of this machine usually, and as shown in the drawings, comprises two side frames or uprights 2 and 4, held together by the top plate 5, carrying the supply-chute H, and by the bottom plate 3, herein shown formed integral with the side frames; or the side frames may be separate and held together by suitable tie rods and braces, as shown in prior Letters Patent to C. H. Cooley. The grain-bucket G of the double-chambered type or class used in the well-known "Hill grain-scale" is suspended under the chute H and discharges its load of grain intermittingly, in the manner substantially as shown in prior Letters Patent of the United States, No. 403,988, granted to C. H. Cooley May 28, 1889.

The construction of the grain-bucket is particularly illustrated by Figs. 5, 6, and 7. The bucket consists of a bucket-frame F, side ribs 140 and 141, outer walls 142 and 143, and partition 144. The frame F has a division-bar 145, separating the spouts 34 and 36, Figs. 6 and 7, and has suitable bosses $12^{a}$ to receive the bucket-bearings 12 12, and its upper edge is shaped to have secured thereto the lower edges of the said walls 142 and 143 by rivets 38 or other similar means. The end ribs 140 and 141 are secured by rivets (not shown) or otherwise to the end walls 146 and 147, respectively, of the frame F, and extend upward to the top of the bucket. These ribs have a groove 63 for receiving the edges of the division-wall 144, as shown in Fig. 6. Cross-bars 91 are sometimes formed in the frame F, connecting the outer walls thereof and the bar 145; but these are not deemed essential. The outer walls 142 and 143 (which are usually, and as shown herein, formed of sheet-metal plates) are secured at their lower edges to the frame F and at their inner edges to said end ribs. This mode of constructing the bucket results in a strong and light structure well adapted to its purpose. The frame F, being integral and having its several walls arranged substantially as shown, is very rigid without being unnecessarily heavy.

The grain-bucket G is journaled at 12 in bearings formed in the hangers 16 and 18, which are suspended by V-shaped bearings on the pivots or knife-edges 15 and 17, respectively, of the principal arms 19 21 of the scale-beam B. This beam has V-shaped bearings 20 22—one at each end thereof—which rest on the pivots or knife-edges 24 26, that are suitably supported, as by bearings 23 25, on the frame-work. Opposite to arms 19 21 an arm 28 extends rearwardly of the scale-beam shaft 50, and is provided with a pivot or knife-edge 27, on which the main weight W (also designated as the "counter-weight") is suspended by a hook 29. The oscillation of the bucket G within the hangers is limited by two pairs of suitable stops 92 and 94 and 93 and 95; but said stops may be of any of the well-known kinds which are shown in prior Letters Patent for the like purpose.

The bucket-closer L is furnished with the arms 75 76, (here shown formed integral with said closer,) which arms are pivoted at 77 78 to the bucket G. The upper ends 79 80 of said closer-arms have fixed therein the studs 83 and 84, which carry, loosely fitted thereon, the slide-blocks 81 and 82, that are fitted to slide between guides formed on the lower ends 8 and 9 of the hangers 16 18, respectively. These sliding-block connections are deemed preferable to a roller on said studs, because less liable to be clogged by dirt. The detent latch or lever 42 is pivoted at 43 to the hanger 16. The long arm of said lever carries the adjustable pin 45, secured in the end thereof, for regulating the operation of the said lever by the latch-bracket 46. The short arm 44 of said lever 42 has the catch 41 formed thereon, a stop-pin 39 being provided to normally limit the upward movement of the said catch. The lever 47, which in form is or may be a segment of a wheel, has two end catches 48 and 49, adapted to engage with the aforesaid catch 41 of the detent-lever 42. The lever 47 is pivoted at 53 to the hanger 16, and the hub of said lever has thereon gear-teeth 51, meshing with similar teeth on the block 40, that is secured to the side of the grain-bucket G by screws, as shown.

The utility and mode of operation of this improvement will be understood by comparing the same, as shown in Figs. 2 and 5, wherein the bucket is shown in opposite positions, respectively. In Fig. 2 the end 49 of the segmental lever 47 rests against the catch 41 of the latch 42. If, now, the lever 42 be raised, the said catches will be disengaged and the part 47 be free to rotate on its said pivot. The rear side of the bucket (at the right hand in Figs. 2 and 5) being loaded, the bucket tends strongly to move toward its position in Fig. 5. This turns the lever 47 until the bucket movement is stopped by the stops 92 and 94, when the catch 41 engages with the opposite end 48 of said lever, and thus locks the bucket in its second position. The purpose of this device is to reduce the pressure on the catch 41, and thus to reduce the power required for the working of said catch, and thereby make relatively more effective the means for disengaging said catch. The lateral force of the bucket being taken on the teeth 51 at a given radius, this force is resisted by the catch 41 acting at about three times as great a radius, so that the pressure on said catch 41 will be one-third (or, as the case may be) of the pressure on the teeth 51. By the methods heretofore employed the entire lateral pressure of the bucket G has been borne by the catches directly, thus creating a considerable resistance to the unhooking of said catches. By our improvements this resistance may be reduced to a small part of the former quantity. This feature of our improvements is not essential to the use of some other features thereof, and in Figs. 12, 13, and 14 a simpler arrangement has been shown. In this instance the catch 41 is on the lever 42 between the pivot 43 and pin 45, while the bucket stop-block 40 is located to engage directly with said catch 41, as will be well understood by comparing said devices in Figs. 12 and 13.

The latch arm or lever 42 extends rearwardly of the hangers and in a direct line rearwardly of the bucket-catch to a point over the latch-bracket, which is carried on the frame at some distance back from said catch. By this means an effective leverage is obtained for overcoming the resistance of the bucket-catches to easily unlock the same, and the working portion of the latch-bracket, being substantially in the plane of the bucket movement, acts on said latch-arm in a direct and proper manner, thus avoiding any twisting or distorting strains on the latch-arm.

In Figs. 12 and 13 is illustrated another feature of our improvements, referred to in claim 4. According to this part of our invention the working-face of the bracket 46 is formed on an arc $m$ $m$ which is concentric to the knife-edge 15 when this edge is at the poising-point. By this means the time of the beginning of the unlocking of the bucket-catches, measured relative to the beam movement, is always the same whether or not the bucket is swung forward, as in Fig. 13, or backward, as in Fig. 12, and whether or not the bucket be descending with a steady or with a swaying movement. Owing to the peculiar nature of our improvements herein described in the cut-off-valve mechanism, this feature of the bucket-restraining apparatus becomes especially important, since it is desirable that the bucket-latches should begin to be disengaged at the valve position substantially, which is shown in Fig. 21.

Figs. 2 and 5 illustrate the mode of operation of the bucket-closer L, which, it will be observed, is carried on the bucket by pivotal supports or journals, and is operated by connection with the hangers on the movement of the bucket relatively to the hangers and in coincidence with the bucket movement. The closer L is in the nature of a sliding valve, which on the disengagement of the bucket-catches is moved from under the spout 34, as in Fig. 5, to a position under the spout 36, as in Fig. 2, or vice versa, as the case may be, and always from under the loaded bucket-chamber.

For counterbalancing the bucket mechanism and its load of grain we employ the improved weight shown in Fig. 1 of the drawings. The main weight W, of a mass balancing the unloaded bucket mechanism, is suspended from the scale-beam by the rod 32, which is secured in said weight by a screw end and the check-nut 33. Said main weight has an annular or other suitable recess 103 formed in the top thereof to receive the usual small pieces for making up the correct weight for balancing the bucket when this is empty of grain. A circular cover 104 is fixed to the top of the main weight, as shown in Fig. 2, and on this cover rests the several load-weights 100, which together should equal in weight the load of grain. These load-weights, as shown in detail in Fig. 15, are symmetrically formed, having the usual slot 101 formed therein to receive the suspension-rod 32, and having in addition the balance-chamber 102, formed therein opposite to the said slot 101 and of a capacity to substantially make up for the portion of the weight cut out to form the slot 101, so that the center of gravity of the weight may be in the center thereof. By this means the weights 100 may all be placed in the same position, as indicated in Fig. 2, without disturbing the center of gravity of the whole counter-weight and without making the rod 32 to swing out of its proper vertical position. This resulting steadiness is especially important in grain-weighers, because of the manner in which the weight is operated. If during its vertical movement the weight is thrown out of line by its overweighting on one side, then on striking its supporting shelf or bracket 108 the weight is set down at one side of its proper place and at once causes a lateral pressure of the V-bearing on the knife-edge 27, and this pressure is liable in practice to be in any direction, since the weights 100 are liable to be set in any position on the cover 104. By our improvements any combination of load-weights does not disturb the proper position of the weight as a whole. The said load-weights have formed on the opposite sides thereof the usual annular tongues and grooves 106 and 107, respectively, for the purpose of centering the said weights on each other. The cylindrical cover 105 is fitted to slide up and down on the suspension-rod, and is preferably formed conical at top for the purpose of shedding grain-dust, &c., falling thereon. This cover forms in practice a part of the weight counterbalancing the unloaded bucket.

The suspension-rod 32 is firmly screwed into or otherwise made fast to the lower end of the hook 29, and is fitted with a V-shaped bearing 31, (similar to the bearings at the upper ends of the hangers 16 and 18,) which is secured thereto in a similar manner by a screw 30. The said bearing rests on the knife-edge 27 of the scale-beam B and supports the main weight. The bearing 31 is seated in a guard-plate 35, having the ends 37 37, which serve as end stops for retaining the bearing 31 in proper position longitudinally of the knife-edge.

We have shown in Figs. 2 and 11 an attachment or accessory device intended more especially for use on large-sized machines for the purpose of limiting the downward movement of the grain-bucket. When weighing a fraction of a load at the end of a series of loads, to ascertain the exact quantity of the last and partial load of grain this attachment is made use of. It is constructed as follows: As shown in detail in Fig. 11 and partially in section in Fig. 2, the bracket 108 is secured to the bottom plate 3 of the framework and has pivoted thereto the stop 109 by the screw 110. In Fig. 11 the said stop is shown in two positions, by full lines in its operative position and by dotted lines in its inoperative position. Said stop is or may be furnished with an ordinary detent pin and spring 115 for the purpose of holding said stop in either said position. A stud 11 is screwed into the bottom of the main weight W, and is furnished with a washer 114, a stop-collar 112, and a nut 113, by which the said stop-collar may be adjusted. When the stop 109 is swung into its operative position, (this being done when the collar 112 is down, as in Fig. 2,) it stands above said collar or stop-face 112, and thus limits the upward stroke of the counter-weight and through this and the scale-beam the downward stroke of the bucket. This stroke being thus limited, the levers 42 do not go down far enough to be unhooked by the brackets 46. In using this stop apparatus the grain in the supply-chute is all run through the machine and registered in the usual way. Frequently at the end of said operation there will be a part of a load in the bucket. The operator in such case interposes the stop 109 into the path of the stop-face 112, and proceeds to remove the load-weights until the load of grain is balanced, thus ascertaining the weight of the final and partial load in the bucket, which is to be added to the quantity indicated by the register. This having been done, the stop 109 is thrown back and the load discharged in the usual manner. This device and method are of use when weighing all the contents of a grain-bin or when weighing an invoice of grain at the mill or elevator.

The valve mechanism for reducing and for cutting off the flow of grain to the bucket is actuated from and by the scale-beam.

The reducing-valve 60 is carried by the arms 62 and 64, that are carried on the pivot-shaft 61, said valve being furnished with a suitable stop, sometimes made adjustable, as the stop 66, to regulate or limit its closing movement. This valve 60 closes under the outlet 65 of the chute H somewhat more than half the width thereof. The valve is actuated by the valve-lever 69 from the valve-actuating arm 71 of the beam B. The construction and mode of operation of this reducing-valve in its preferred form is fully set forth in the prior application of C. H. Cooley, Serial No. 338,818, filed January 31, 1890, to which reference may be had.

The cut-off valve 70 is carried by the arms 72 and 74, pivoted at 73 to the supply-chute H, the said valve having, if desired, an adjustable stop 67 to limit its closing movement. The arm 72 is continued above the pivot 73, and carries the cam 68 and some suitable weight, as 90. The mode of operating the cut-off valve is shown more fully in the enlarged views, Figs. 19 to 23, inclusive. For the purpose of illustrating the ordinary mode of operation let us assume the actuator 55, which in this case is a small roller carried by the stem (or slide) 54, to be carried at a fixed point on the beam-arm 19, as shown in Fig. 20. We may then divide the vertical movement of said actuator (and also of the beam) into several periods, represented by the positions $p$, Fig. 19, $p'$, Fig. 20, $p^2$, Fig. 21, and $p^3$, Fig. 22. In Fig. 19 the beam is at its highest point, as in Figs. 2 and 3. In Fig. 20 the beam has descended to the theoretical poising-point, when the reducing-valve is supposed to be closed. (When reference is herein made to the movement of the "scale-beam," the movement of the bucket-supporting arms thereof is meant, this coinciding of course with that of the bucket itself.) In Fig. 21 the beam has descended to the end of the poising period or the "actual" poising-point, this being the position where the valve-weight 90, acting through the lever and cam, acquires a sufficient power to accelerate the downward movement of the beam. At this actual poising-point the roll 55 stands on a line $n\ n$, passing through the edge of the cam, and which is considerably inclined to the line $p^2$, so that at said moment (when there is no longer any need for more grain to flow into the bucket) the closing movement of the cut-off valve is rapidly accelerated, and cuts off the drip-column very suddenly. Immediately after this, when the drip is substantially cut-off, the bucket-latches strike the abutments 46 and unhook the bucket, and the beam descends to the position shown in Fig. 22. During this latter part of the beam movement the curved cam-face 14 bears with a greatly-increased force on the roll 55, and thereby exerts a powerful downward thrust on the beam, thus furnishing ample power for unlocking said bucket-latches.

The cam 68 being above the pivot 73 of the cut-off valve, and the valve-arm being of a short radius, the cam follows the beam in its downward movement, and thus has a more direct and effective action thereon. This arrangement and combination of the several parts enables us to use a large angular movement of the valve relatively to the extent of the beam movement, thereby obtaining a long stroke for the weight 90 on the arm of the cut-off valve. This result is highly important, because it is necessary that the position and stroke of said weight shall be such as to have only a very small effect on the beam when in the position shown in Figs. 2 and 20, and shall have a rapidly-increasing effect when said valve begins to close. In Fig. 20 said weight stands almost directly over the pivot 73, thus exerting a very slight effect on the beam. In Fig. 22 the effective leverage of said weight is several fold increased, owing to its aforesaid large angular movement.

There is another feature of our improved valve mechanism illustrated in Fig. 23, which is perhaps not obvious from Figs. 19 to 22, inclusive. It will have been observed that the cam 68 has three faces 6, 7, and 14. The part 6 of the cam-face is used during the closing of the reducing-valve, the part 7 during the poising period and is substantially coincident in extent with the poising movement of the beam, and the part 14 is used to cut off the drip and to effect the discharge of the grain. Since the face 7 bears with some pressure against the actuator 55 on the beam during the poising period, it is obvious any resistance caused by such pressure will to that extent vitiate the precision of the machine. To overcome this result we make the face 7 neutral to the downward movement of the beam and not to the upward movement thereof. In Fig. 23 the line V is supposed to be at right angles to the poising-line $p'$. If the face 7 were parallel with the line V, it is obvious there would be some little resistance to the beam movement in either direction, due to the friction of the roller 55 on its pin and on the said face 7. Accordingly we construct the face 7 to neutralize said resistance by setting said face on the line $x$ at an angle to line V, representing what is generally designated by mechanics as "the angle of repose." This angle Z is shown in the drawings to be about eight degrees, being so figured in said Fig. 23. For the purposes of reference thereto we designate the face 7 as being "under cut," since the lower part thereof is cut under the line V by an amount corresponding substantially with the angle of repose. By this means during the sub-poise period from point $p'$ to point $p^2$ the angle of the face 7 causes the weighted valve to exert substantially the same downward thrust on the beam as the pressure on said actuator causes resistance to the downward movement of the beam. This accurately neutralizes the said resistance and renders the same of no injurious effect. By this means we attain the important result of materially diminishing the percentage of error of the weighing.

The cut-off valve has a surplus or extra closure for the purpose of cutting off the "drip" prior to beginning to open the bucket-latches, so that the impact of the falling column of grain entirely ceases before the beam encounters any resistance to its downward movement. This cut-off valve and the combinations therewith are in the nature of an improvement on the corresponding valve mechanism and combinations set forth in the application of C. H. Cooley, Serial No. 338,544, filed January 30, 1890.

The cut-off valve 70 is utilized as a regulator-valve by means of connections from the shiftable actuator to the regulator P. The said regulator P is supported between the uprights 2 and 4 of the frame-work by suitable pivots at 98 and 99, and has attached thereto in any well-known manner the arm 10, carrying the counter-weight 11. To the said hopper is pivotally connected the rod 13, which is pivoted at 87 to the arm 85 of the rotary reciprocating cam 88, that is pivoted at 86 to the arm 52 of the scale-beam B. The valve-actuator slide 54 has journaled at the rearward end thereof the cam-roll 56, which bears on the face of the regulator-cam 88, and at the forward end thereof carries the aforesaid actuator-roll 55, which bears on the face of the cut-off-valve cam 68. The slide 54 may be retracted by the spring 57, one end of which is attached to a pin 58, fixed in said slide, and the opposite end to a similar pin 59, fixed in the arm 19 of the beam B, or said slide may be freely fitted and be retracted by the weight of the cut-off valve acting through the cam 68; but this regulator apparatus is not of our invention, but is described and claimed in separate applications filed by F. H. Richards, Serial Nos. 340,814, filed February 17, 1890, 341,104, filed February 20, 1890, and 324,242, filed September 17, 1889.

We have devised and shown in detail in Figs. 16, 17, and 18 improvements for regulating the drip-columns, whereby to regulate to some extent the speed of the machine, and especially to adapt the machine to the weighing of different kinds of grain. This regulator consists in a movable rear wall for said drip-channels and in means for adjusting said wall. As herein shown, the said walls 121 are formed on the slides 128 and 129, which are fitted to slide in the guides or straps 130, that are screwed to the under side or floor of supply-chute H. Said walls 121 slide between the sides 123 of the drip-channels. The shaft or rod 125 for operating the said slides is carried in suitable bearings, as 131 and 132, formed on the chute H, and carries the arms 126 and 127, which engage with notches formed in said drip-adjusting slides 128 and 129, respectively, and act as levers to move the said slides. An arm 135, which is shown as a spring-arm, is secured to one end of the shaft 125, and serves as a means for turning the said shaft and thus to actuate the said slides. The arm 135 is provided with a knob for operating it, and with a detent-pin 136 for locking the slides by entering the holes 137 and 138, formed in the chute H for that purpose. The proper position for said holes to suit any particular size and kind of grain is readily determined experimentally. The slides 128 and 129 may be narrow, as shown, or may be much wider, even so wide as to include the entire length of the rear wall of the spout, and may be formed in separate parts, as shown, or may be formed integral, as not shown, but as will be readily understood.

Heretofore in the art of grain-weighing it has been customary to ascertain the quantity of grain discharged by directly registering the movements of the scale-beam; but this method of registration of the quantity of grain weighed is open to some serious practical objections, since the movement of the poised scale-beam is so easily disturbed by any mechanism connected thereto, however delicate such connection may be, and because under some circumstances and at certain times during the taking of a load the scale-beam has some oscillation, whereby the registering apparatus is liable to be erroneously operated. By our present improvements these objections are entirely avoided, since we here omit all connection of the register with the scale-beam, and instead thereof construct the registering apparatus to be actuated wholly from another source—to wit, the grain-bucket by its movement relative to its supporting part or hangers, as shown in Figs. 12, 13, and 14. It is well known that in the type of grain-weighers in which the bucket is arranged to be movable, as set forth, in its supporting-hangers, so that the movement of said bucket to discharge its load is due to the weight of said load, the said bucket movement is a powerful one, and has a force or power largely in excess of that required to open the bucket-closers. By our invention this excess of power is utilized to actuate the registering apparatus, which is thereby operated in a very positive and reliable manner without interfering in anywise with the scale-beam. By this means we attain a reliability of the registration not obtainable by the old method, and one commanding a high degree of confidence.

In the drawings, 120 represents some suitable register actuated by the lever 121. This lever is connected by the rod 122 to a pivot at 119 on the hanger 16. On the movement of the bucket relative to the hanger, as from its position in Fig. 12 to that in Fig. 13, the lever 121 is operated, as shown in said figures, without any interference with the scale-beam. It will be understood that the position, as shown in Fig. 12, of the register may be reversed, the register being placed on the hanger 16 and the lever 121 connected to a stud on the bucket. It is evident that such reversal would not effect the purpose of the combination.

The regulator P and certain combinations therewith shown herein embody improvements constituting the subject-matter of a separate application, Serial No. 340,284, filed by C. H. Cooley and F. H. Richards February 13, 1890.

The improvements in valve mechanism herein shown and described and of our invention are described and claimed in our application, Serial No. 358,658, filed July 14, 1890.

The improvements in the counter-weight for the grain-buckets herein shown and described of our invention are described and claimed in our application, Serial No. 358,659, filed July 14, 1890.

The improvements in the supply-chute and the adjustment thereof herein shown and described of our invention are described and claimed in our application, Serial No. 358,660, filed July 14, 1890.

The improvements in the grain-bucket, together with certain combinations thereof herein shown and described of our invention, are described and claimed in our application, Serial No. 360,246, filed July 28, 1890.

Having thus described our invention, we claim—

1. In a grain-weigher, the combination, with the hangers, of a double-chambered grain-bucket journaled thereto and having adjacent spouts whose lower ends are substantially concentric with the closer-pivots, the bucket-closer carried on said closer-pivots and constructed to be swung thereon to close said spouts alternately, and connections between the closer and the hangers operating to swing said closer from under one spout to under the other spout on the movement of the bucket relatively to the hangers, said closer being of a curvature corresponding to the curvature of the bucket-spouts.

2. In a grain-weigher, the combination, with the hangers, of the double-chambered grain-bucket journaled thereto and having adjacent spouts whose lower ends are substantially concentric with the closer-pivots, the bucket-closer carried on said closer-pivots and constructed to be swung thereon to close said spouts alternately, said closer being of a curvature corresponding to that of the bucket-spouts and being supported by closer-arms rigidly formed thereon, and connections operating said closer from the hangers on the movement of the bucket in the hangers, said connections consisting in the hanger below the bucket-pivot engaging the closer-arms above the closer-pivot.

3. In a grain-weigher, the combination, with the hangers, of the double-chambered grain-bucket journaled therein and having adjacent spouts whose lower ends are substantially concentric with the closer-pivots, the closer-pivots 77, fixed in said bucket below the bucket-pivots, the closer L, journaled on said pivots 77 and adapted to be swung under said spouts and having upwardly-projecting arms connected with the lower end of the hangers between the bucket-pivots and the closer-pivots, and stops limiting the bucket movement in the hangers, whereby the closer is moved on the bucket in the direction of the bucket movement and is stopped under the spout of the filling bucket-chamber.

4. In a grain-weigher, the combination, with a frame-work supporting the scale-beam fulcrums, of the scale-beam carried on said fulcrums, the hangers suspended from said beam at a distance from said fulcrums and forward of the frame-work, the bucket carried by the hangers and movable relatively thereto, the bucket-catches, the latch-arm carried by one of said hangers and having a catch engaging said bucket-catch, and the latch-actuating bracket carried on the frame-work and located rearward of the hangers, working parts of said bracket being located on a line substantially concentric to the hanger-supporting edges when the beam is at the poising-point.

5. In a grain-weigher, the combination, with the hanger and with the bucket supported by said hanger and having detent-catches, substantially as described, of the lever 42, lying in the plane of the bucket movement and extending rearward of the hangers, and the bracket 46, having its working-face also in said plane and in the plane of said lever, whereby torsional strains and resistances are avoided and a leverage is obtained for disengaging said catches.

6. In a grain-weigher, the combination, with the hanger and with the latch-lever located to be operated by a fixed stop or bracket and having a detent-catch, of the segmental stop or detent-lever operatively connected with the bucket, whereby the pressure on the latch-catches is reduced.

7. In a grain-weigher, the combination, with the hanger and with the bucket movable relative thereto, of the latch-lever pivoted on said hanger and having detent-catches, the segmental lever 47, pivoted to the hanger and of one radius, and means, substantially as described, operatively connecting said segmental lever with the bucket by a shorter radius, whereby the pressure on the catches is reduced.

8. In a grain-weigher, the combination, with the hanger and the bucket, of the lever 42, having catch 41 and pivoted intermediate of its length to the hanger, the segmental lever 47, pivotally supported on the hanger and having end catches engaging with catch 41, and gearing, substantially as described, operatively connecting said lever with the bucket, whereby the pressure of the bucket is transmitted to catch 41 with a reduced force.

9. In a grain-weigher, the combination, with the scale-beam carrying the bucket mechanism having bucket-catches constructed to be detached by a fixed stop on the frame-work on the descent of the bucket to a given point, the counter-weight and a bracket for supporting the same in its lowermost position, said weight having stop-faces limiting its vertical movement, and the stop interposable into the path of one of said stop-faces and of a thickness to arrest the downward movement of the bucket at about the poising-point before disengagement of the bucket-catches.

CHARLES H. COOLEY.
FRANCIS H. RICHARDS.

Witnesses:
HENRY L. RECKARD,
W. M. BYORKMAN.